Figures 1, 2:
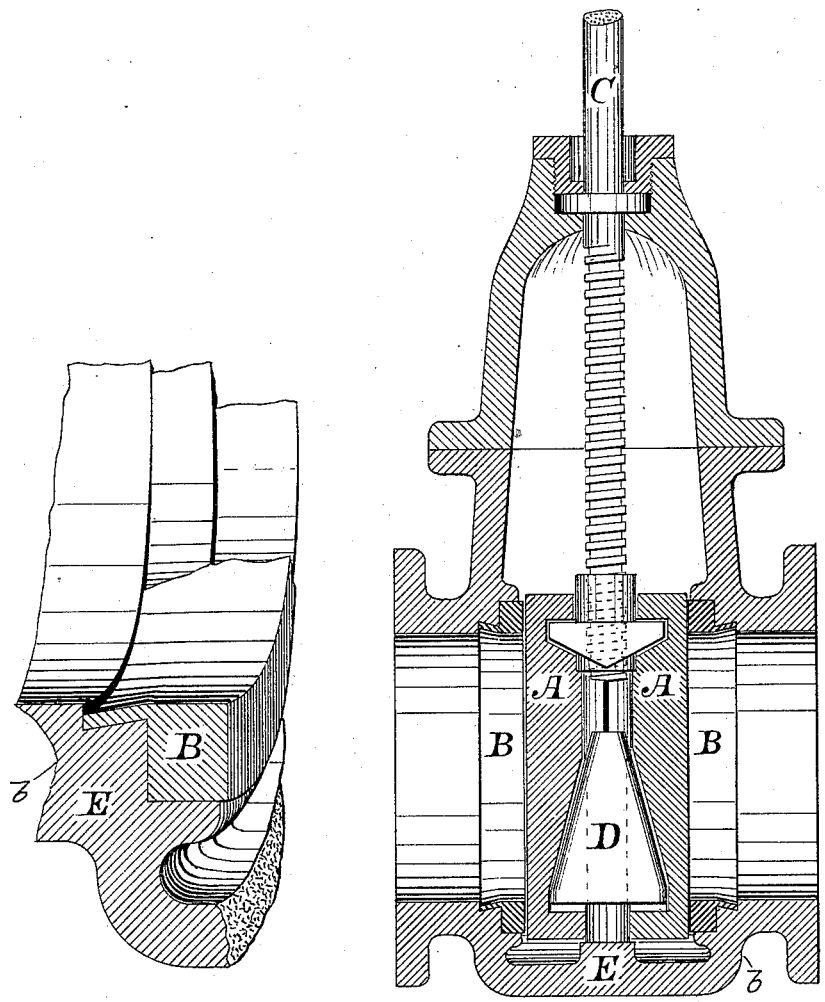

(No Model.)

J. T. PAGET.
STRAIGHT WAY VALVE.

No. 302,209. Patented July 15, 1884.

Witnesses
Joel F. Brown
Peter F. Duchemin

Inventor
Joseph T. Paget

UNITED STATES PATENT OFFICE.

JOSEPH T. PAGET, OF BOSTON, MASSACHUSETTS, ASSIGNOR TO THE PEET VALVE COMPANY, OF SAME PLACE.

STRAIGHT-WAY VALVE.

SPECIFICATION forming part of Letters Patent No. 302,209, dated July 15, 1884.

Application filed October 13, 1883. (No model.)

*To all whom it may concern:*

Be it known that I, JOSEPH T. PAGET, a citizen of the United States, residing at Boston, county of Suffolk, State of Massachusetts, have invented and produced a new and useful Improvement in the Construction of Straight-Way Valves, of which the following is a specification, reference being had to the accompanying drawings, forming part thereof.
Figure 1 is a vertical section of a valve, showing my newly-designed seats or rings B B', in connection with the disks A A' and the wedge D. Fig. 2 is an enlarged section of my newly-designed valve seat or ring B, showing the manner in which it is attached to the valve-body E.

The invention comprising the subject of this application may be considered in the light of an improvement upon that for which Letters Patent in the United States of America were issued on the 1st day of January, 1867, to Samuel J. Peet, of New York, and on the 2d day of February, 1869, to Benj. F. Radford, of Hyde Park, and Daniel Sawyer, of Boston, Massachusetts, for improvements in valves.
The object of my improvement is to secure a valve seat or ring that can be easily and cheaply replaced when worn out, and that will not become loosened or leaky when exposed to the action of steam or other bodies passing through it.

Heretofore valves have been made of iron with brass seats screwed or pressed into them. When the valve has been made of brass, the seat has been cast solid with the body. All of these different modes of construction render the renewal of the seats, which are the parts most subject to wear, an expensive and in most cases a difficult undertaking, for it involves the stoppage of the works where the valve is in use while the latter is being repaired at the machine-shop.

The leading feature of my design consists of the dovetailed ring B, Fig. 2, expanded into a corresponding ring in the valve-body E. It will thus be seen that the ring B forms the valve-seat, and that it has projecting backward from the inner edge thereof an annular extension, *b*, which is expanded into the groove or recess B', and that this groove or recess is behind the rest or shoulder which receives and sustains the main portion of the ring B. It will also be seen that before the ring or seat is inserted in place this extension *b* is of such shape that it can be easily inserted in place, and that the extension becomes only in a narrow sense a dovetail projection after its shape has been changed in whole or in part by forcing it into the groove or recess. Of course this invention can be used in valves having one valve-seat, or in valves having two, and in the drawings it is represented as applied to a straight-way valve of the Peet construction.

By my improvement all that is required to renew the seats or rings is to place them in their proper place and expand the dovetail into a corresponding groove in the valve-body E by means of a set-chisel or other mechanical device. Of course the worn-out rings will first be removed. All this can be done wherever the valve is in use, and avoids the delay and expense incurred by transportation to the machine-shop.

B B', Fig. 1, are my newly-designed dovetailed rings or seats.

A A' are the disks of the valve, which, being forced upon the wedge D by the action of the screw C, are expanded against the rings B B'. It can thus be seen how liable the seats or rings are to become loosened or worn, and how necessary it is to have some quick and efficient mode of replacing them. By my improvement these latter qualifications are supplied.

It will be observed that I form in the valve-body, back of the recess for holding or receiving the valve-seat, a recess or groove, and that the valve-seat is a removable ring having an extension from its inner edge, which extension is adapted to be driven into the recess or groove back of the shoulder upon which the valve-seat rests, either by being expanded therein by lateral pressure thereon, or by being driven in by a chisel, or in any other desirable way, and that having thus driven this locking-extension of the seat into its groove or recess the valve-seat is very firmly and solidly secured in place, and it can be by the proper tools very easily removed therefrom when worn out, to give place to another ring of like construction, without injury to the valve-body, or requiring any manipulation that cannot be performed by almost any person who has any knowledge of valve construction.

I am aware of Patent No. 197,994, to M. Burnett, dated December 11, 1877, for an improvement in stop-cocks, which describes a construction for holding a valve-seat, comprising a holder having a dovetail recess for the reception of a dovetail projection upon the valve-seat, which is forced therein, and a flange which projects into the water-way, and is held in place by a lead sleeve driven between it and the body of the valve; but as I do not use a separate holder or a lead plug, and as I fasten my valve seat or seats directly to the valve-body, I consider that said patent does not describe the essential features of my invention.

Having thus fully described my invention, I claim and desire to secure by Letters Patent of the United States—

1. The combination, in a valve, of the valve-body, having an annular groove or recess formed therein, with the ring B, having the extension $b$ projecting from its inner edge, and expanded or forced into the said groove or recess, all substantially as and for the purposes described.

2. The combination, in a straight-way valve, of the valve-body having an annular groove or recess upon each side of the valveway, the seats B B', each of which has a backward extension, $b$, which is expanded or forced into its respective recess or groove, the disks A A', the wedge D, and the screw C, all substantially as and for the purposes set forth.

JOSEPH T. PAGET.

In presence of—
  JOEL F. BROWN,
  CHARLES E. PAGET.